United States Patent
Kim

(10) Patent No.: US 7,545,714 B2
(45) Date of Patent: Jun. 9, 2009

(54) METHOD FOR CONTROLLING DATA READ SPEED OF OPTICAL DISC

(75) Inventor: Beom Jin Kim, Kyonggn do (KR)

(73) Assignee: LG Electronics Inc., Seoul (KR)

( * ) Notice: Subject to any disclaimer, the term of this patent is extended or adjusted under 35 U.S.C. 154(b) by 620 days.

(21) Appl. No.: 11/337,077

(22) Filed: Jan. 23, 2006

(65) Prior Publication Data
US 2006/0187783 A1 Aug. 24, 2006

(30) Foreign Application Priority Data
Jan. 24, 2005 (KR) .................. 10-2005-006155

(51) Int. Cl.
*G11B 7/00* (2006.01)
(52) U.S. Cl. ................... 369/47.43; 369/94
(58) Field of Classification Search ............ 369/275.3, 369/47.48, 53.22, 47.28, 47.38, 94, 47.43, 369/47.4, 47.1
See application file for complete search history.

(56) References Cited

U.S. PATENT DOCUMENTS

| | | | | |
|---|---|---|---|---|
| 5,265,081 A | * | 11/1993 | Shimizume et al. | 369/47.48 |
| 5,926,453 A | * | 7/1999 | Muramatsu et al. | 369/275.4 |
| 6,704,252 B2 | * | 3/2004 | Aso et al. | 369/30.11 |
| RE39,491 E | * | 2/2007 | Ota et al. | 369/53.28 |

* cited by examiner

*Primary Examiner*—Nabil Z Hindi
(74) *Attorney, Agent, or Firm*—Ked & Associates LLP

(57) ABSTRACT

Embodiments of method and apparatus for controlling a data read speed of an optical disc can reproduce data with greater accuracy. An embodiment of a method for controlling data read speed can determine whether the optical disc is finalized or in an open state, and a playback speed can be controlled by the determined result. If the optical disc is in an open state, a data-recorded section can be divided into at least two areas, and different speeds are applied to individual areas. If the optical disc is finalized, a relatively high speed or maximum speed is applied to all areas of the optical disc. Therefore, data of an unfinalized open-state disc can be reproduced at high speed. Further, increased resistance to surface vibration, eccentricity, or defects of the optical disc can be achieved.

23 Claims, 5 Drawing Sheets

METHOD FOR CONTROLLING DATA READ SPEED OF OPTICAL DISC

BACKGROUND OF THE INVENTION

1. Field of the Invention

The present invention relates to a method for controlling a data read speed of an optical disc.

2. Background of the Related Art

A variety of disc recorders, for example, DVD-recorders, are capable of recording large amounts of high-quality video data and high-quality audio data in an optical disc such as a DVD (Digital Versatile Disc). However, as described above, the related art DVD recorder has various disadvantages.

For example, when the related art DVD-recorder reproduces data recorded in an unfinalized state at high speed, an optical pickup unit reads the end part of the data-recorded section, and then moves from the data-recorded section to an unrecorded area, and the DVD-recorder may have difficulty in controlling the optical pickup unit. Thus, the related art DVD-recorder reproduces data of the unfinalized optical disc at low speed. Accordingly, the DVD-recorder has difficulty in increasing a playback speed of the unfinalized optical disc, such that it does not have a variety of advantages, which are acquired when data of the disc is reproduced at high speed, such as strong resistance to surface vibration, eccentricity, and defects of the disc, and the like at the low playback speed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a method and apparatus for controlling data read speed of an optical disc that obviates one or more disadvantages of the related art or achieves one or more of the advantages described herein in a whole or in part.

Another object of the invention is to provide a method and apparatus capable of increasing a playback speed of an unfinalized rewriteable optical disc.

Another object of the invention is to provide a method and apparatus for controlling data read speed of an optical disc that decreases reproduction errors when reproducing data of an unfinalized optical disc.

Another object of the invention is to provide a method and apparatus for controlling data read speed of an optical disc that enhances data read speed when data of an unfinalized rewritable optical disc is reproduced.

In accordance with one aspect of the invention, the above and other objects can be accomplished in a whole or in part by a method for controlling a data read speed of an optical disc that includes determining whether the optical disc is finalized state or is in an open state and variably controlling a playback speed when the disc is in the open state.

According to a further aspect of the invention, when the optical disc is in the open state, a data-recorded section can be divided into at least two areas and different reproducing speeds are applied to individual areas. However, when the optical disc is finalized, a maximum speed can be applied to all areas of the optical disc.

In accordance with one aspect of the invention, the above and other objects can be accomplished in a whole or in part by a method for controlling a data read speed of an optical disc that includes variably controlling a playback speed when the disc is in the open state.

In accordance with one aspect of the invention, the above and other objects can be accomplished in a whole or in part by an apparatus for controlling a data reproduction speed for an optical disc that includes a disc recorder/reproducer configured to operate according to a designated data reading speed and a controller coupled to the disc recorder/reproducer and configured to variably designate a data reading speed for an open state disc by dividing a data-recorded section into at least two areas and applying different speeds to each of the at least two areas.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
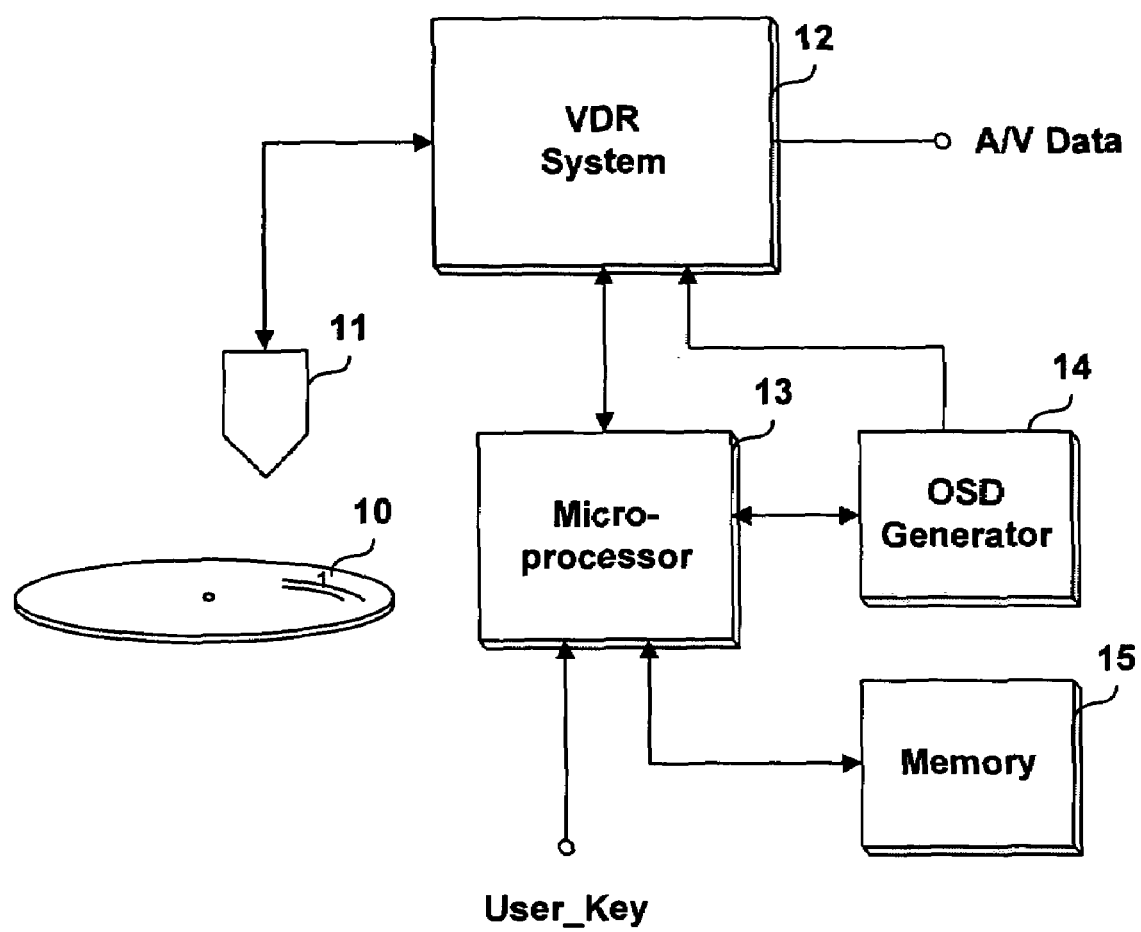
FIG. 1 is a block diagram illustrating a related art optical disc apparatus.
Figure 2:
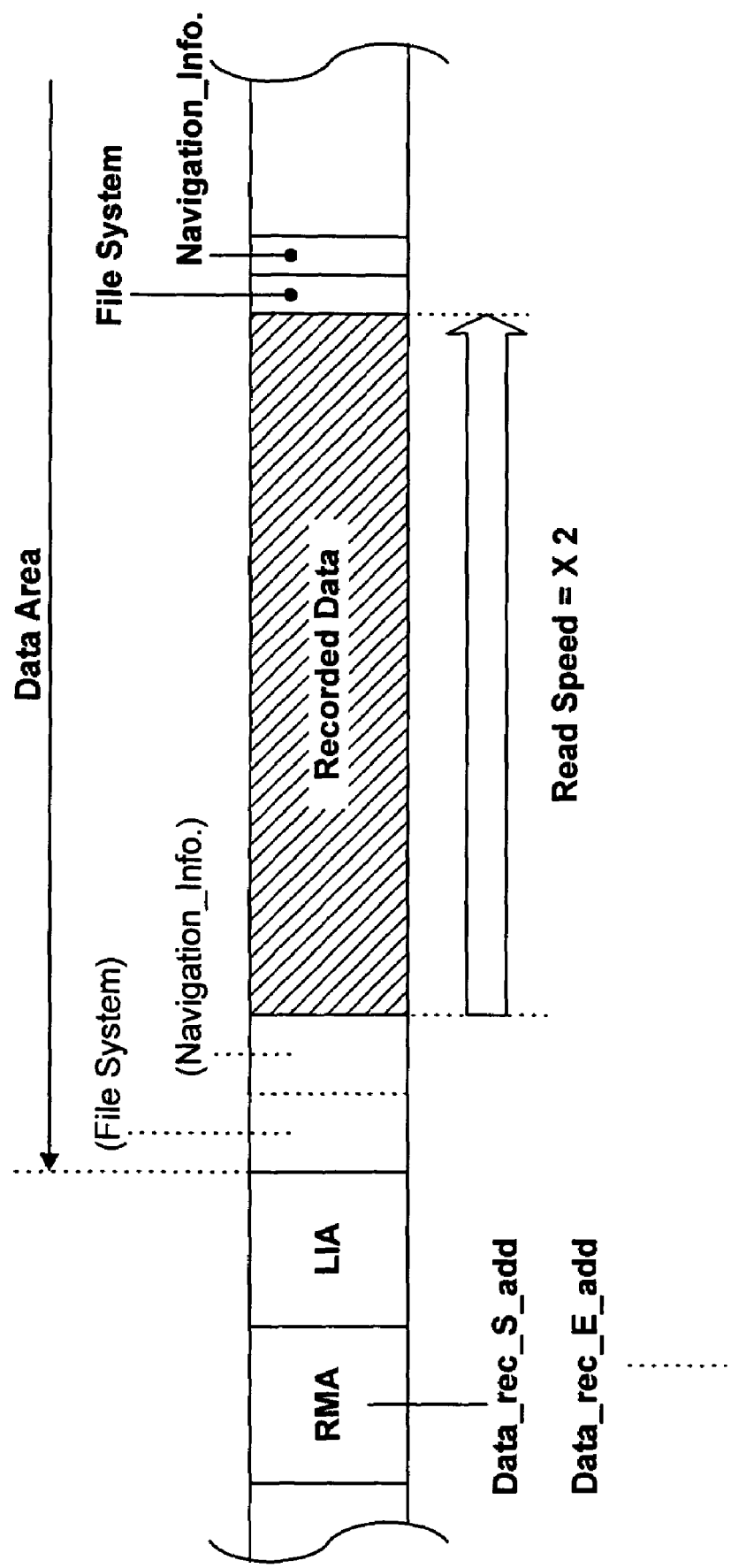
FIG. 2 is a diagram that shows exemplary reading data used by the related art optical disc apparatus.

A DVD recorder can include an optical disc 10, an optical pickup unit 11, a VDR (Video Disc Recording/reproducing) system 12, a microprocessor 13, an OSD (On Screen Display) generator 14, and a memory 15, etc., as shown in FIG. 1. If the microprocessor 13 performs a data record operation upon receiving a request from a user, it controls the VDR system 12 to record data in a data area of the optical disc 10. For example, the optical disc such as a DVD-RW disc includes an RMA (Record Management Area), an LIA (Lead-In Area), and a data area, etc., as shown in FIG. 2.

Data is recorded in the data area from which a predetermined head area is subtracted. If a recording operation for a predetermined amount of data in the data area is terminated, for example, in the case of a specific disc (e.g., a DVD+R disc), file system information is recorded in an end part of the data-recorded section in the data area, and data record start position information (Data_rec_S_add) and data record end position information (Data_rec_E_add) for the data-recorded section are recorded in the RMA.

When a user enters a request to finalize an optical disc, the microprocessor 13 performs a disc finalization operation to prevent new data from being recorded in the optical disc. File system information and navigation information, which have been recorded in the end part of the data-recorded section, are recorded/managed in a predetermined head part of the data area. The data record start position information (Data_rec_S_add) and the data record end position information (Data_rec_E_add), which have been recorded in the RMA, are recorded/managed in the LIA.

When data of an unfinalized optical disc is reproduced, the microprocessor 13 controls the VDR system 12 to set a data read speed to a predetermined speed (e.g., a 2×-speed). At the predetermined speed, a servo operation for an unfinalized optical disc can be stably performed.

Embodiments of apparatus and methods for controlling a data read speed of an optical disc according to the invention can be applied to and will be described using the DVD-recorder shown in FIG. 1. However, the invention is not intended to be so limited.

Figure 3:
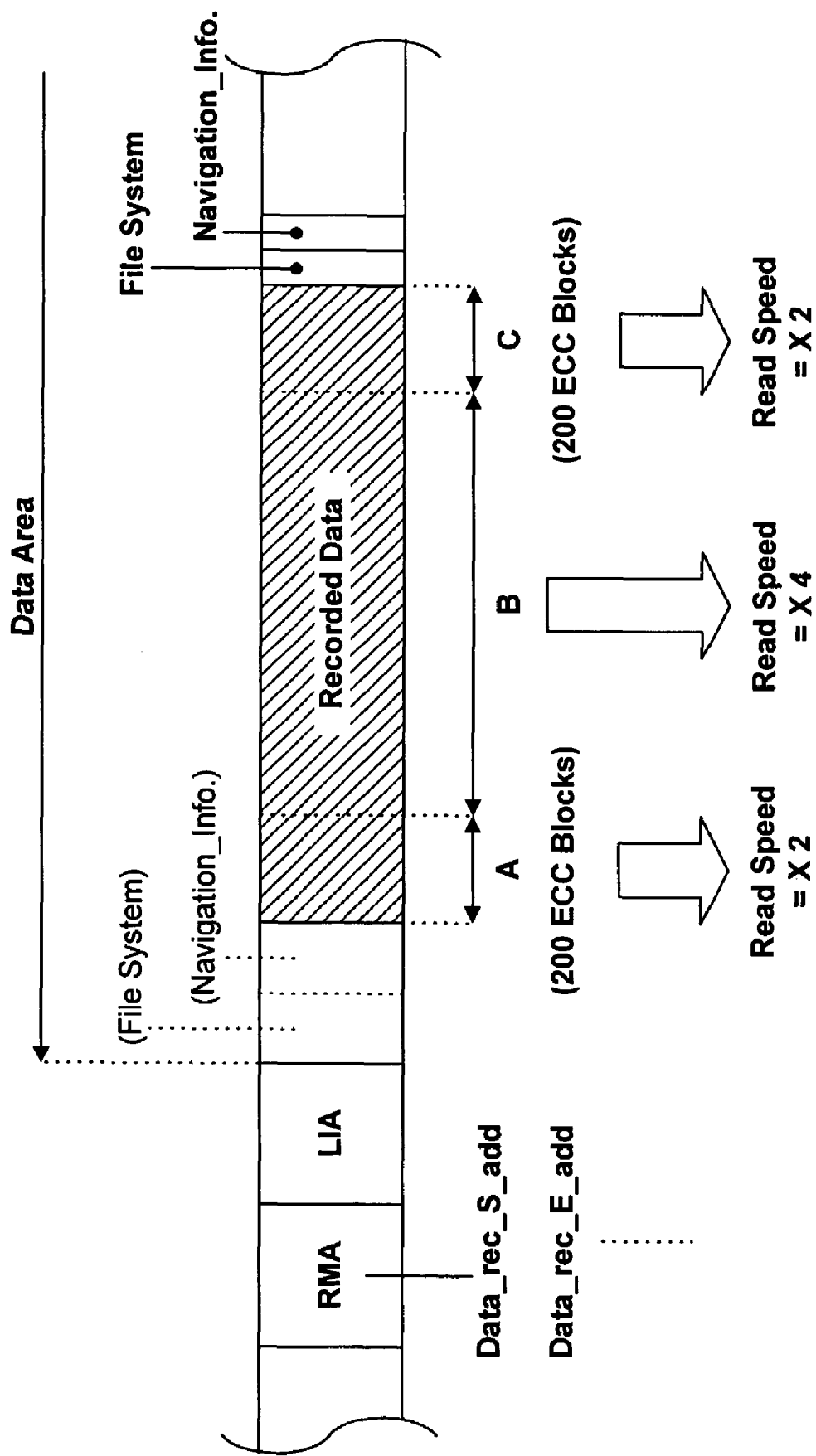
FIG. 3 is a diagram that shows a method for controlling a data read speed of an optical disc according to an embodiment of the present invention.

As shown in FIG. 3, each data-recorded section in the data area of an unfinalized optical disc can be divided into a first area A, a second area B, and a third area C. A data read speed of "m" (e.g., 2×-speed) can be applied to the first area A. A data read speed of "n" (e.g., 4×-speed) can be applied to the second area B. A data read speed of "m" can be applied to the third area C.

Preferably, the "m" data read speed can stably perform servo operations for an unfinalized disc. Preferably, the "n" data read speed can achieve high speed reproduction of the unfinalized disc.

Therefore, as shown in the embodiment of FIG. 3, a high-speed playback operation having a variety of advantages such as strong resistance to surface vibration, eccentricity, and defects of a disc, can be applied to the unfinalized optical disc.

Figure 4:
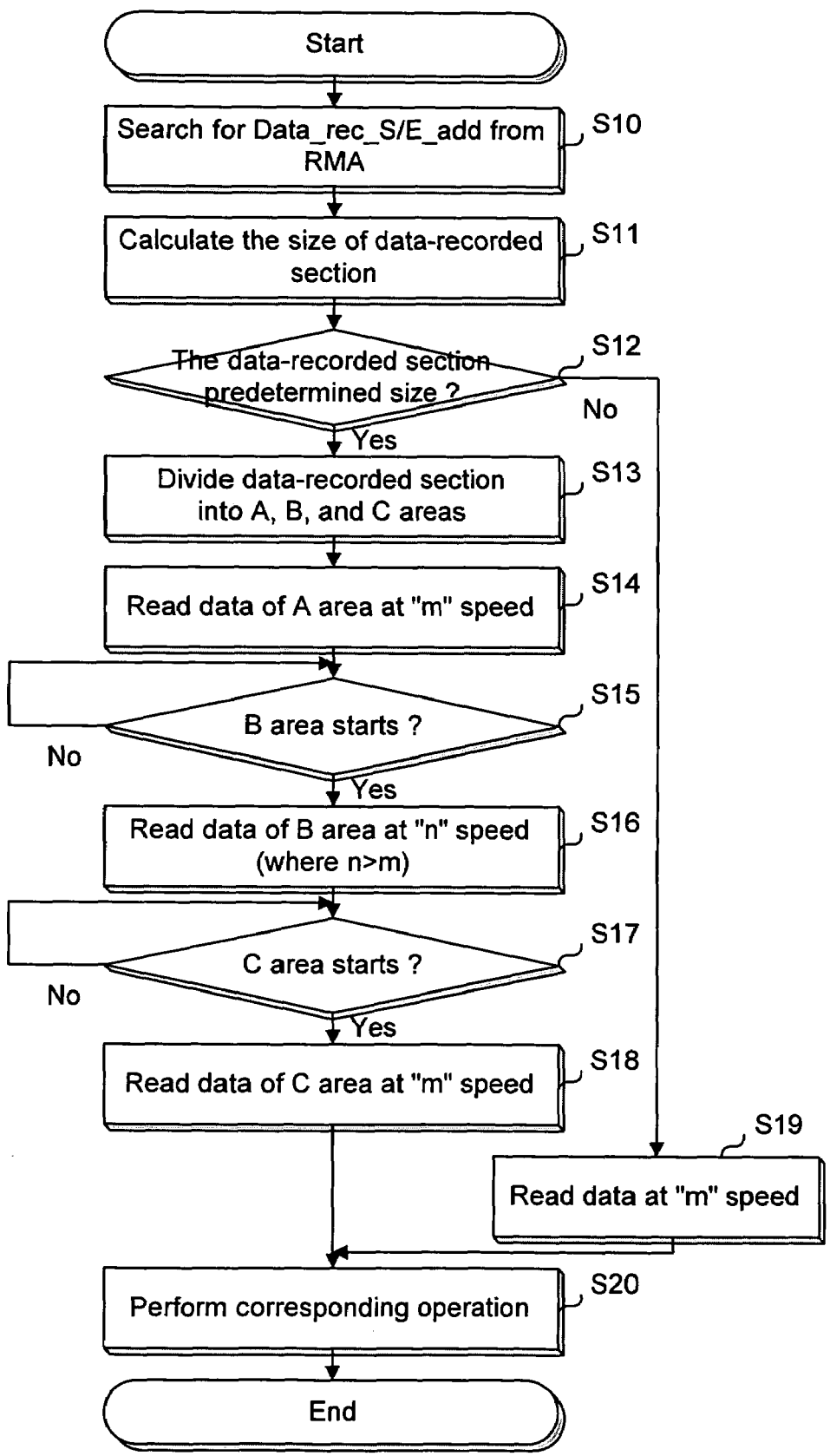
FIG. 4 is a flow chart illustrating a method for controlling a data read speed of an optical disc according to another embodiment of the present invention.

FIG. 4 is a flow chart illustrating a method for controlling a data read speed of an optical disc according to an embodiment of the present invention. As shown in FIG. 4, when reproducing data in a desired data-recorded section in the data area of the unfinalized optical disc 10, the microprocessor 13 can search for both data record start position information (e.g., Data_rec_S_add in FIG. 3) and data record end position information (e.g., Data_rec_E_add in FIG. 3) for the data-recorded section from the RMA of the optical disc 10 (block S10). The microprocessor 13 can calculate the size of the data-record section on the basis of the data record start position information (Data_rec_S_add) and the data record end position information (Data_rec_E_add) (block S11).

If the calculated size of the data-recorded section is equal to or larger than a predetermined size (e.g., 600 error correction code (ECC) blocks or greater) (block S12), the data-recorded section can be divided into first, second, and third areas (e.g., A, B, and C shown in FIG. 3) (block S13). The first area A can range from a start position of the data-recorded section to first K ECC blocks. The third area C can range from an end position of the data-recorded section to second K ECC blocks. The second area B can be positioned between the first and third areas A and C.

The value of K is preferably indicative of an amount of data capable of stabilizing a spindle speed. For example, the amount of data is determined to be 200 ECC blocks in embodiments of the invention. However, the invention is not intended to be so limited.

If the data-recorded section is divided into the first to third areas A, B, and C, the microprocessor 13 can control operations of the VDR system 12 to set a data read speed to a predetermined value of m, (e.g., m 2×-speed) in the first area A (block S14). If a data read position reaches a start position of the second area B (block S15), the microprocessor 13 can set a data read speed to a predetermined speed of n (e.g., n 4×-speed) in the second area B, such that the VDR system 12 reads data from the optical disc 10 at high speed (block S16). Thereafter, if the data read position reaches a start position of the third area C (block S17), the microprocessor 13 can set a data read speed to a predetermined speed of m (e.g., m 2×-speed), such that the VDR system 12 reads data from the optical disc 10 at relatively low speed (block S18).

If the size of the above-mentioned data-recorded section is less than the predetermined size (e.g., 600 ECC blocks or less), the microprocessor 13 can determine data read speed for the data-recorded section to be a predetermined speed of m (e.g., m=2×-speed), such that it reads data at relatively low speed (block S19). Thereafter, the microprocessor 13 can perform operations desired by a user (block S20).

Figure 5:
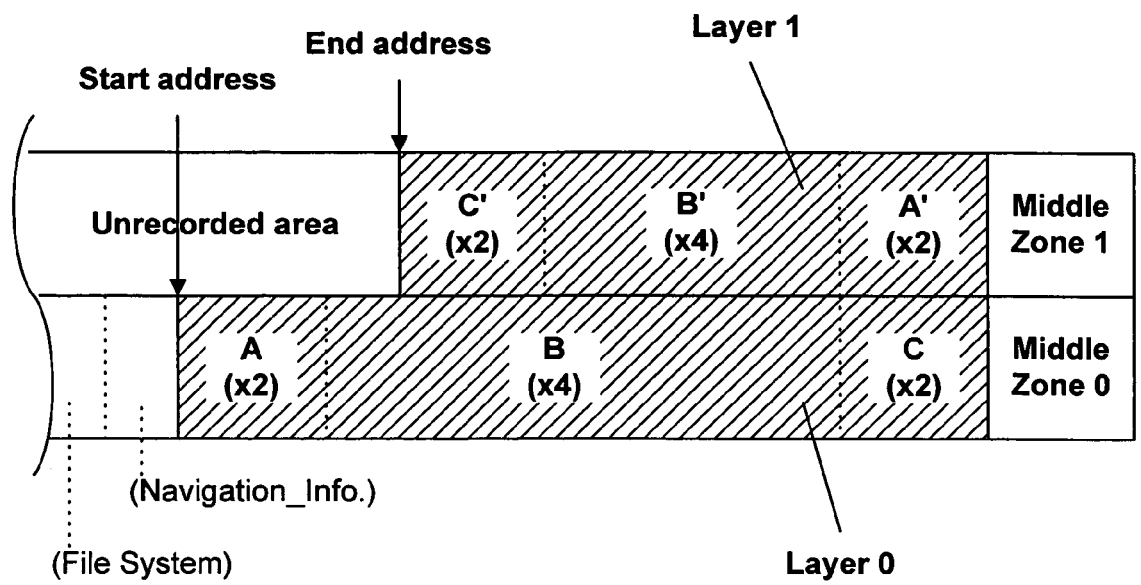
FIG. 5 is a diagram that shows an exemplary dual layer structure according to the present invention.

As shown in FIG. 5, a middle zone between a first record layer and a second record layer contained in a dual-layer disc can record data therein when the dual-layer disc is finalized. When reproducing data of an unfinalized dual-layer disc in which the first record layer (e.g., Layer 0) is fully recorded and the second record layer ((e.g., Layer 1) is not fully recorded, a servo operation may be unstable between the end part of the data area of the first record layer (e.g., Layer 0) and the middle zone (e.g., Middle Zone 0) having no data.

Therefore, the microprocessor 13 can divide the data-recorded section of the first record layer (Layer 0) of the unfinalized dual-layer disc into first, second, and third areas A, B, and C, as shown in FIG. 5. The microprocessor 13 can also divide the data-recorded section of the second record layer (Layer 1) into first, second, and third areas A', B', and C'.

In the first record layer (e.g., Layer 0), 2×-speed can be applied to the first area A, 4×-speed can be applied to the second area B, and 2×-speed can be applied to the third area C. In the second record layer (Layer 1), 2×-speed is applied to the first area A', 4×-speed is applied to the second area B', and 2×-speed is applied to the third area C'. Therefore, the unfinalized dual-layer disc can be reproduced using a stable servo operation, and can efficiently perform a high-speed playback operation.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above embodiments of methods and apparatus for controlling a data read speed of an optical disc according to the invention have various advantages. For example, embodiments of the invention can reproduce data of an unfinalized open-state disc at high speed, which can result in a variety of advantages acquired when a high-speed playback operation is performed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling a data read speed of an optical disc, comprising:
   determining whether the optical disc is in a finalized state or an unfinalized state; and
   variably controlling a playback speed when the disc is in the unfinalized state, wherein variably controlling the playback speed comprises:
   dividing a data recorded section into at least two areas, and applying different playback speeds to each of the at least two areas,
   wherein the data-recorded section is divided into the at least two areas when a size of the data-recorded section is equal to or larger than predetermined size.

2. The method according to claim 1, wherein the data-recorded section is divided into first, second, and third areas and wherein:
   the first area ranges forward from a start position of the data-recorded section and includes a first K ECC blocks;
   the third area ranges backward from an end position of the data-recorded section and includes a second K EGG blocks; and
   the second area is between the first and third areas.

3. The method according to claim 2, wherein K is a value set to correspond to an amount of data capable of stabilizing a spindle speed by detecting a Radio Frequency (RF) signal.

4. The method according to claim 3, wherein the value of K is 200 blocks or greater.

5. The method according to claim 2, wherein the second area employs a 4x, 8x or 16x speed and the first and third areas employ a 2x speed.

6. The method according to claim 2, wherein the second area employs a maximum speed.

7. The method according to claim 2, further comprising:
   dividing each of data-recorded sections of a first record layer and a second record layer into corresponding first, second, and third areas.

8. The method according to claim 1, wherein the a size of the data-recorded section is recognized by referring to navigation information recorded in a record management area (RMA) of the optical disc.

9. The method according to claim 1, further comprising:
   dividing each of data-recorded sections of a first record layer and a second record layer into corresponding first, second, and third areas when the optical disc has a dual-layer structure in which the first record layer is recorded and some areas of the second record layer are not recorded.

10. The method according to claim 1, comprising applying a maximum speed to all data-recorded areas of the optical disc when the optical disc is the finalized state.

11. A method for controlling a data read speed of an optical disc, comprising:
   variably controlling a playback speed for different data-recorded areas of the disc when the disc is in an unfinalized state, wherein a first playback speed is applied to a first data-recorded area and a second playback speed is applied to a second data-recorded area and wherein the first and second data-recorded areas store data of a same media format.

12. The method according to claim 11, further comprising:
   dividing the data-recorded section into at least the first and second data-recorded areas when the data-recorded section has a size equal to or larger than a predetermined size.

13. An apparatus for controlling a data reproduction speed for an optical disc, comprising:
   a disc recorder/reproducer configured to operate according to a designated data reading speed; and
   a controller coupled to the disc recorder/reproducer and configured to variably designate a data reading speed for an open state disc by dividing a data-recorded section into at least two areas and applying different speeds to each of the at least two areas, wherein the data-recorded section is divided into the at least two areas when a size of the data-recorded section is equal to or larger than a predetermined size.

14. The apparatus of claim 13, wherein the data-recorded section is divided into first, second, and third areas when the size of the data-recorded section is equal to or larger than said predetermined size, and wherein the second area employs a playback speed greater than the first and third areas.

15. The method according to claim 1, wherein the at least two data-recording areas store data of a same media format.

16. The method according to claim 15, wherein the same media format corresponds to a video format.

17. The method according to claim 1, wherein the at least two data-recording areas store a same type of media data.

18. The method according to claim 1, wherein:
   the at least two data-recording areas are located between an initial area and an unrecorded area of the disc,
   a first playback speed is applied to a last one of the at least two data-recording areas and a second playback speed is applied to another one of the at least two data-recording areas, and
   the second playback speed is greater than the first playback speed.

19. The method according to claim 11, wherein the first and second data-recorded areas store a same type of data.

20. The method according to claim 19, wherein the same type of data is video data.

21. The apparatus of claim 13, wherein the at least two data-recording areas store data of a same media format.

22. The apparatus of claim 21, wherein the same media format corresponds to a video format.

23. The apparatus of claim 13, wherein the at least two data-recording areas store a same type of media data.

* * * * *